INDAZOLIUM DERIVATIVES

Robert Frederic Michel Sureau, Enghien-les-Bains, and Georges Raymond Henry Mingasson, Paris, France, assignors to Etablissements Kuhlmann, Paris, France
No Drawing. Filed Jan. 11, 1963, Ser. No. 250,772
Claims priority, application France, Jan. 13, 1962, 884,763
3 Claims. (Cl. 260—310)

The present invention concerns new indazolium derivatives and dyestuffs produced therefrom.

French patent of Addition 1,211,449 of May 6, 1960 describes dyestuffs with the general formula:

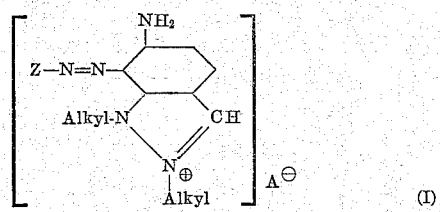

in which Z represents the residue of a diazotisable primary aromatic or heterocyclic amine, free from solubilising groups, such as hydroxy, sulphonic or carboxy groups but possibly substituted by halogen atoms, nitro, alkyl, alkoxy, sulphonamido, alkylsulphonyl, acylamino, carbonamido or nitrile groups, A is a monovalent anionic radical or its equivalent, and the "Alkyl" groups may be identical or different.

According to this patent of addition, dyestuffs with the general Formula I may be prepared in various ways:

The azo dyestuffs obtained by coupling the diazo compounds of bases having the formula $Z-NH_2$ with 6-aminoindazole may be treated with an alkylating agent, for example in solution in a chlorinated benzenic hydrocarbon. Under these conditions, salts are obtained with the Formula II which avoid a greater degree of alkylation due to their insolubility in the reaction medium.

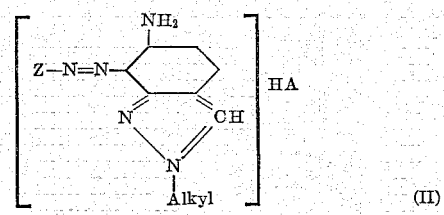

The free bases of these dyestuffs, corresponding to the bracketed portion of Formula II may be precipitated by rendering alkaline the aqueous solution of the salts of Formula II by means of a base, such as ammonia or caustic soda. When treated again in solution in an organic solvent such as, for example, chlorobenzene, the xylenes, or nitrobenzene, with an alkylating agent, they yield quaternary dyestuffs of Formula I. However, experience shows that the reaction is never complete, probably due to the steric hindrance which makes the introduction of the second alkyl group in the 1-position difficult. The dyestuffs prepared in this manner are contaminated with the starting products and their purification is difficult.

Another method of preparing dyestuffs of Formula I consists in coupling the diazo derivatives of bases having the formula $Z-NH_2$ with a 6-amino-2-alkyl-indazole and in quaternising the resulting dyestuffs. However, the 6-amino-2-alkyl-indazoles are not easily accessible and the second phase of the method presents the same difficulties as the preceding method.

A third method for preparing dyestuffs of Formula I consists in treating with an alkylating agent the isomers (III) of dyestuffs of Formula II obtained by coupling the diazo derivatives of bases having the formula $Z-NH_2$ with 6-amino-1-alkyl-indazoles. Generally, this method yields, after complete reaction, pure dyestuffs and the 2 position is sterically unobstructed.

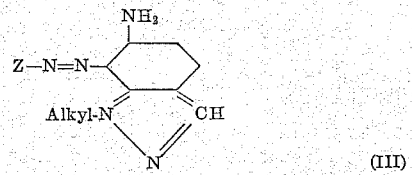

Unfortunately, the 6-amino-1-alkyl-indazoles are available only in poor yields after a very difficult separation of their 2-alkyl isomers so that the third method of preparation is technically no more profitable than the two preceding ones.

We have now found that dyestuffs of Formula I are generally very easily accessible with excellent yields and with a high degree of purity by a fourth method, using 1,2-dialkyl-6-amino-indazolium salts.

These salts are new products and they may be obtained, for example, in the following manner:

6-nitro-indazole is treated with an alkylating agent, possibly in solution in an organic solvent such as benzene or its chloro derivatives, toluene, or the xylenes. Amongst the alkylating agents that may be used are, for example, halides, arylsulphonates, or alkyl sulphates. One obtains a 1,2-dialkyl-6-nitro-indazolium salt which is then reduced to the corresponding 1,2-dialkyl-6-amino-indazolium salt preferably by means of one of the known methods involving a pH equal to, or lower than 7.

The reactions may be represented diagrammatically as follows:

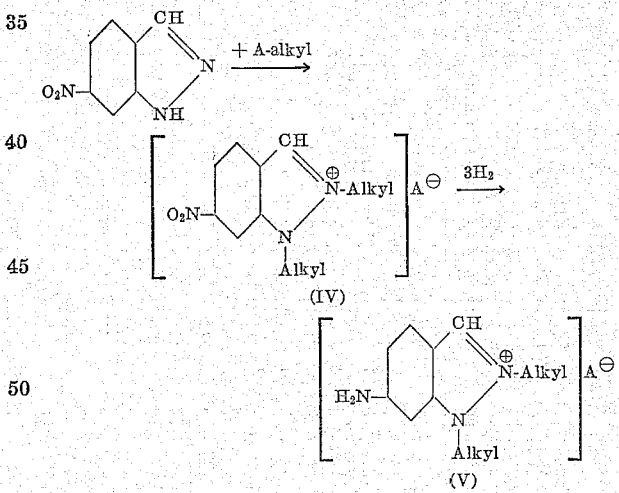

Moreover, in the first phase of this reaction, the 6-nitro-indazole may be replaced at choice by one of its 1-alkyl or 2-alkyl derivatives, according to whether the alkyl group of the alkylating agent is the same or different from that already fixed in the 1 or 2 positions, resulting in compounds (IV) or (V) having identical or different alkyl groups.

The 1,2-dialkyl-6-amino-indazolium salts are crystalline colourless compounds which are generally very soluble in water. The aqueous solutions are stable, especially at a pH lower than, or equal to, 7, and have the property of coupling easily within this pH range with the diazo derivatives of primary aromatic or heterocyclic amines. This property, which is rather surprising in view of the strongly electro-attractive nature of the quaternary ammonium group, makes it easy to arrive at dyestuffs with the Formula I.

The present invention relates therefore to a method for preparing dyestuffs having the general Formula I, which comprises coupling the diazo derivative of an amine having the formula Z—$NH_2$ with an indazolium salt having the general Formula V.

The nucleus Z of Formula I may have other substituents than those mentioned in the French patent of addition, such as, for example, the trifluoromethyl, alkoxycarbonyl, fluorosulphonyl, phenoxy or phenoxysulphonyl group, and the benzene nucleus of these may itself be substituted by halogen atoms or by alkyl groups.

The dyestuffs obtained in this way are of great interest for dyeing fibres based on the polymers or copolymers of acrylonitrile, owing to their strong affinity for these fibres. The resulting shades, covering especially the range from yellow-to-red, are usually characterised by their very good general fastness.

The invention will be more clearly understood by reference to the following examples, which are purely illustrative and in which parts are by weight unless otherwise stated.

EXAMPLE 1

82 parts of 6-nitro indazole are introduced in fractions over 30 minutes into 126 parts of freshly distilled dimethyl sulphate. The mixture is heated for two hours to 135–140° C. and then allowed to cool to 80–90° C., diluted with 600 parts water and the resulting hot solution is filtered. 200 parts fine salt are added to the filtered solution and the mixture is allowed to stand for 24 hours. The crystalline 1,2-dimethyl-6-nitro-indazolium hydrochloride is filtered, centrifuged and dried. The recovered weight is 120 parts.

100 parts of this salt are redissolved in 500 parts of hot water and the resulting solution is introduced at about 95° C. over 30 minutes into a well-stirred mixture of 75 parts of fine iron filings, 300 parts of water and 7.5 parts of acetic acid, which has been brought to the boil. Heating to 95–100° C. is continued for another hour, then the mixture is cooled, made slightly alkaline by adding solid sodium carbonate in order to precipitate the iron hydroxide, filtered, the iron sludge is washed with hot water and the filtrate is made slightly acid (about pH 6) by adding acetic acid. The solution of 6-amino-1,2-dimethyl-indazolium salt may be used directly for the preparation of azo derivatives after determination, for example by means of a titrated solution of the azo compound of m-nitraniline. It is stable without appreciable alteration for several days. Moreover, the salt may be isolated by concentrating the reduction solution to a small volume. The white crystalline product may be purified by recrystallisation from absolute alcohol. Melting point (not corrected): 227–228° C.

EXAMPLE 2

12.7 parts of o-chloroaniline are dissolved in 150 parts of water and 30 parts by volume of concentrated hydrochloric acid, cooled to 5° C. by adding ice and diazotised by pouring a solution of 6.9 parts of sodium nitrite into 25 parts water. After about 20 minutes, the slight excess of nitrous acid is destroyed by adding just the right amount of sulphamic acid, and the diazo solution is poured into a solution of 22 parts of 1,2-dimethyl-6-amino-indazolium hydrochloride in 200 parts of water and 28 parts of crystalline sodium acetate. The coupling is very rapid and the major part of the dyestuff is precipitated. When the entire diazo derivative has disappeared, the dyestuff is precipitated by adding 40 parts of sodium chloride. After several minutes agitation, the mixture is filtered, centrifuged and dried at 60–70° C.

Weight recovered: 35 parts of a dyestuff colouring fibres based on acrylonitrile polymers to a vivid yellow shade and having good general fastness.

The crude dye melts at 255–256° C. After recrystallisation from alcohol the melting point (uncorrected) is 259–260° C. without lowering by mixing with the dyestuff obtained according to Example 2 of the first French patent of Addition 1,211,449.

EXAMPLE 3

13.8 parts of finely divided o-nitraniline, 6.9 parts of sodium nitrite and 25 parts of water are made into a paste and this paste is placed into a mixture of 30 parts by volume of concentrated hydrochloric acid and 100 parts of water at 12–15° C. The mixture is stirred for 20 minutes, the excess of nitrite, if present, is destroyed, the product filtered, and the diazo derivative poured into a solution of 22 parts of 1,2-dimethyl-6-amino-indazolium hydrochloride in 200 parts water. No addition of sodium acetate is necessary and the coupling is very quickly terminated. The precipitation is activated by salting with 50 parts of sodium chloride. The product is filtered, centrifuged and dried at 70° C., with a yield of 31 parts. It represents a new dyestuff which dyes fibres based on acrylonitrile polymers and copolymers to a full-bodied orange shade with excellent fastness, especially to light.

EXAMPLE 4

15 parts of 2-amino-benzothiazole are dissolved in 200 parts of acetic acid. 20 parts of 66° Bé sulphuric acid and 100 parts of water are added. The mixture is cooled to 0° C. and diazotised by adding a solution of 7 parts of sodium nitrite in 50 parts of 66° Bé sulphuric acid. After 30 minutes, this solution is poured into a solution of 22 parts of 1,2-dimethyl-6-amino-indazole hydrochloride in 600 parts of water. Coupling is rapid. When the diazo derivative has disappeared, the precipitated dyestuff is filtered and washed in salted water (2½%) in order to eliminate the excess acid.

The new dyestuff, dried at 60–70° C., weighs about 22 parts. It dyes fibres based on acrylonitrile polymers and copolymers to a bright, full bodied orange.

Other new dyestuffs according to the invention, which may be prepared in a similar manner to the above examples are given in the following table:

Table I

| No. | Diazotised base Z—$NH_2$ | Shade on polyacrylic fibres |
|---|---|---|
| 5 | m-Chloroaniline | Yellow. |
| 6 | p-Chloraniline | Do. |
| 7 | 2,5-dichloro-aniline | Golden yellow. |
| 8 | m-Toluidine | Yellow. |
| 9 | p-Toluidine | Do. |
| 10 | m-Nitraniline | Do. |
| 11 | p-Nitraniline | Yellowish orange. |
| 12 | 2-Methoxy-5-nitro-aniline | Golden yellow. |
| 13 | 2-methoxy-4-nitro-aniline | Reddish orange. |
| 14 | 4-methoxy-2-nitro-aniline | Orange. |
| 15 | 2-methyl-5-nitro-aniline | Yellow. |
| 16 | 2-methyl-4-nitro-aniline | Orange. |
| 17 | 2-chloro-4-nitroaniline | Yellowish orange. |
| 18 | 4-chloro-2-nitro-aniline | Orange yellow. |
| 19 | 4-benzoylamino-5-methoxy-2-chloro-aniline. | Yellow. |
| 20 | 2-methoxy-5-diethylsulphonamido-aniline. | Do. |
| 21 | 2-methoxy-5-carbonamido-aniline | Orange. |
| 22 | 2,5-dimethoxy-aniline | Yellow ochre. |
| 23 | 2-methoxy-5-methyl-aniline | Bistre yellow. |
| 24 | 2-methoxy-5-chloro-aniline | Golden yellow. |
| 25 | 2-nitro-4-methyl-aniline | Orange. |
| 26 | 3-nitro-4-methyl-6-methoxy-aniline | Golden yellow. |
| 27 | 2-methyl-4-chloro-aniline | Do. |
| 28 | 2-methyl-5-chloro-aniline | Do. |
| 29 | 3,4-dichloro-aniline | Yellow. |
| 30 | 3-nitro-4-chloro-aniline | Golden yellow. |
| 31 | 4-cyano-aniline | Do. |
| 32 | 3-cyano-4-methyl-aniline | Do. |
| 33 | 3-sulphonamido-aniline | Yellow. |
| 34 | 4-sulphonamido-aniline | Golden yellow. |
| 35 | 2-methoxy-5-sulphonamido-aniline | Do. |
| 36 | 2-methyl-5-diethylsulphonamido-aniline | Do. |
| 37 | 3-diethylsulphonamido-4-methyl-aniline | Greenish yellow. |
| 38 | 4-phenylsulphonamido-aniline | Do. |
| 39 | 3-phenylsulphonamido-4-methyl-aniline | Do. |
| 40 | 4-isopropylsulphonamido-aniline | Yellow. |
| 41 | 4-diethylsulphonamido-aniline | Do. |
| 42 | 4-diethylaminopropylenesulphonamido-aniline. | Do. |
| 43 | 2-methyl-4-dimethylsulphonamido-aniline. | Do. |
| 44 | 2-methylsulphonyl-aniline | Golden yellow. |
| 45 | 4-methylsulphonyl-aniline | Do. |
| 46 | 2-methyl-5-methylsulphonyl-aniline | Do. |
| 47 | 3-trifluoromethyl-aniline | Greenish yellow. |

Table 1—Continued

| No. | Diazotised base Z—NH$_2$ | Shade on polyacrylic fibres |
|---|---|---|
| 48 | 2-methoxycarbonyl-aniline | Golden yellow. |
| 49 | 4-methoxycarbonyl-aniline | Do. |
| 50 | 4-fluorosulphonyl-aniline | Do. |
| 51 | 4-phenoxysulphonyl-aniline | Do. |
| 52 | 2-methyl-5-phenoxysulphonyl-aniline | Do. |
| 53 | 2-chloro-5-phenoxysulphonyl-aniline | Do. |
| 54 | 4-(2'-methyl-phenoxy)-sulphonyl-aniline | Do. |
| 55 | 4-(3'-methyl-phenoxy)-sulphonyl-aniline | Do. |
| 56 | 4-(4'-methyl-phenoxy)-sulphonyl-aniline | Do. |
| 57 | 4-(2'-chloro-phenoxy)-sulphonyl-aniline | Do. |
| 58 | 4-(4'-chloro-phenoxy)-sulphonyl-aniline | Do. |
| 59 | 2-methyl-4-phenylsulphonyl-aniline | Do. |
| 60 | 2-phenoxy-aniline | Greenish yellow. |
| 61 | 2-(2'-methyl-phenoxy)-aniline | Do. |
| 62 | 4-phenoxy-aniline | Do. |
| 63 | 4-(2'-methyl-phenoxy)-aniline | Do. |
| 64 | 4-(3'-methyl-phenoxy)-aniline | Do. |
| 65 | 4-(4'-methyl-phenoxy)-aniline | Do. |
| 66 | 4-(2'-chloro-phenoxy)-aniline | Do. |
| 67 | 4-(4'-chloro-phenoxy)-aniline | Do. |
| 68 | 2-acetyl-4-nitro-aniline | Orange. |
| 69 | 4-amino-2'-nitro-diphenyl sulphide | Golden yellow. |
| 70 | 4-amino-4'-nitro-diphenyl sulphide | Do. |
| 71 | 2-amino-4'-nitro-diphenyl sulphide | Do. |
| 72 | 2-amino-2'-nitro-4'-chloro-diphenyl sulphide | Do. |
| 73 | 4-amino-2'-nitro-4'-chloro-diphenyl sulphide | Do. |
| 74 | 2-amino-2'-nitro-4-chloro-diphenyl sulphide | Do. |
| 75 | alpha-naphthylamine | Orange. |
| 76 | beta-naphthylamine | Do. |
| 77 | 6-amino-indazole | Yellow. |
| 78 | 4-chloro-6-amino-indazole | Orange yellow. |
| 79 | 3-amino-1,2,4-indazole | Yellow. |
| 80 | 3-amino-indazole | Do. |
| 81 | 5-nitro-2-amino-thiazole | Red. |

If, in Example 1, the dimethyl sulphate is replaced by a corresponding quantity of diethyl sulphate, there is obtained under otherwise identical conditions 1,2-diethyl-6-nitro indazolium hydrochloride which may be reduced in the same way to the 1,2-diethyl-6-amino indazolium salt. This new compound has the same coupling properties as the dimethyl derivative. Table II summarises a certain number of dyestuffs prepared according to a method identical to that described in Examples 2 and 3. These dyestuffs have dyeing properties very similar to those of their corresponding dimethyl compounds.

Table II

| No. | Diazotised base Z—NH$^2$ | Shade on polyacrylic fibres |
|---|---|---|
| 82 | p-Nitraniline | Orange. |
| 83 | 2-methoxy-4-nitro-aniline | Reddish orange. |
| 84 | 2-methyl-4-nitro-aniline | Orange. |
| 85 | 3-chloro-aniline | Yellow. |
| 86 | 2-methyl-5-chloro-aniline | Do. |
| 87 | 2-methyl-4-chloro-aniline | Golden yellow. |
| 88 | 4-phenoxysulphonyl-aniline | Do. |
| 89 | 4-methoxycarbonyl-aniline | Do. |

We claim:
1. A colorless compound of the formula

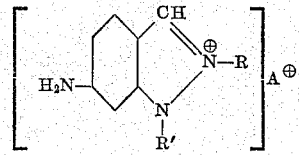

wherein R and R' are lower alkyl and A$^\ominus$ is an anionic radical.

2. 1,2-dimethyl-6-amino-indazolium chloride.
3. 1,2-diethyl-6-amino-indazolium chloride.

References Cited by the Examiner
UNITED STATES PATENTS

| 2,788,345 | 4/57 | Hanhart | 260—157 |
| 2,817,658 | 12/57 | Bossard et al. | 260—157 |
| 2,971,006 | 2/61 | Mayhew et al. | 260—309.6 |
| 3,037,029 | 5/62 | Huber et al. | 260—309.6 |

OTHER REFERENCES

Auwers et al.: Berichte (D.C.G.), vol. 58, pp. 1360–69 (1925).

Davies: Jour. Chem. Soc. (London), 1955, pp. 2412–23.

WALTER A. MODANCE, *Primary Examiner.*
CHARLES B. PARKER, NICHOLAS S. RIZZO,
*Examiners.*